Sept. 23, 1941.    F. BRUSS    2,256,885
VEHICLE CHASSIS FRAME
Filed March 18, 1938    3 Sheets-Sheet 1
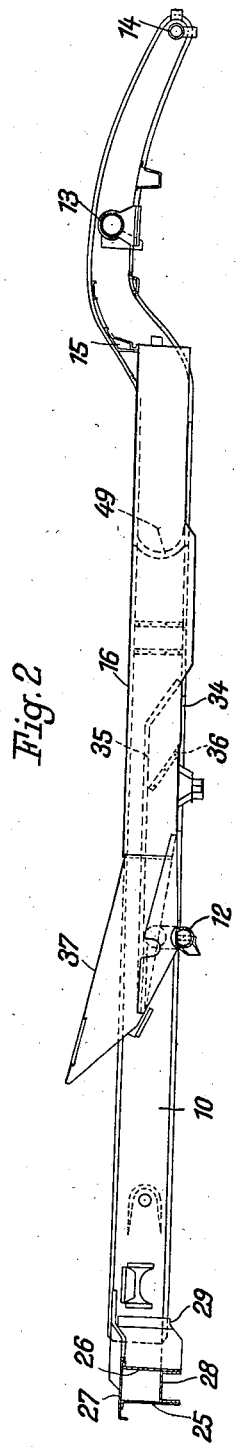
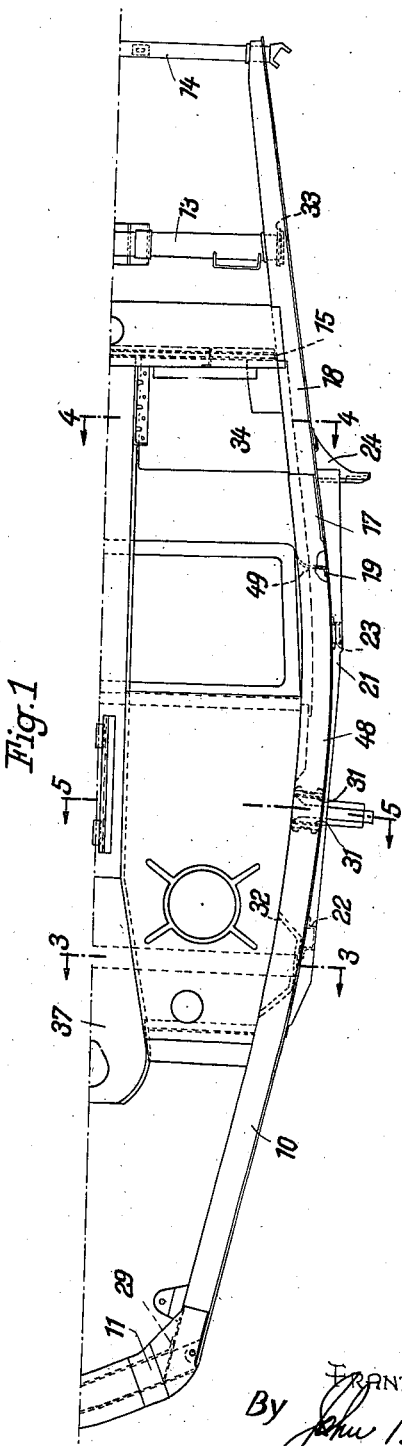
Inventor:
Franz Bruss.
By John P. Tarbox
Attorney Sept. 23, 1941. F. BRUSS 2,256,885
VEHICLE CHASSIS FRAME
Filed March 18, 1938 3 Sheets-Sheet 2
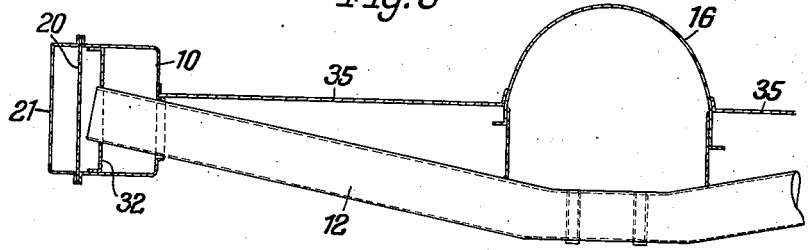
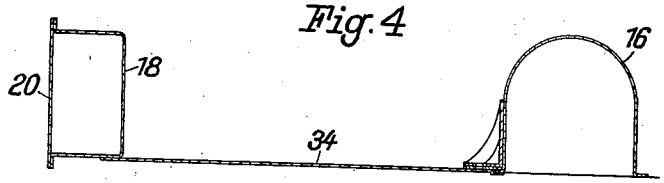
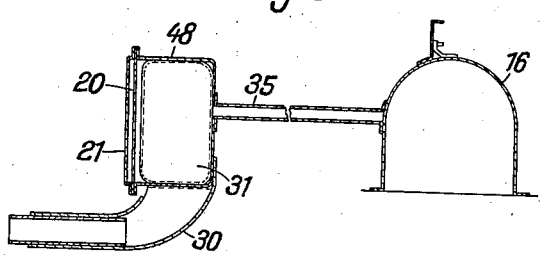
Inventor:
Franz Bruss
By John P. Tarbox
Attorney.

Sept. 23, 1941.   F. BRUSS   2,256,885
VEHICLE CHASSIS FRAME
Filed March 18, 1938   3 Sheets-Sheet 3

INVENTOR:
FRANZ BRUSS
BY
John P. Tarbox
ATTORNEY

Patented Sept. 23, 1941

2,256,885

UNITED STATES PATENT OFFICE 2,256,885

VEHICLE CHASSIS FRAME

Franz Bruss, Berlin-Johannisthal, Germany, assignor to Edward G. Budd Manufacturing Company, Philadelphia, Pa.

Application March 18, 1938, Serial No. 196,596
In Germany March 19, 1937

11 Claims. (Cl. 280—106)

This invention relates to a vehicle chassis frame or body underframe and has for its object to provide such a chassis frame or underframe which combines a very high degree of strength with comparatively low weight, which is resistant to torsion, is manufactured readily and which serves as a secure foundation member to support the body.

My improved chassis frame or underframe for a vehicle is comprised of box section longitudinal side members inter-connected by hollow section transverse members, the front transverse member being a built up box section structure.

Further objects of my invention will appear from the description of a preferred embodiment of my invention following hereinafter and the features of novelty will be pointed out in the claims.

The invention is illustrated by way of example in the accompanying drawings, which are of a schematic nature, and of which Figure 1 is a half plan view of a chassis frame or body underframe in accordance with the invention;

Figure 2 is a central longitudinal section through said underframe; and

Figures 3, 4 and 5 are half transverse sections on the lines 3—3, 4—4 and 5—5 of Figure 1 respectively.

Figure 6:
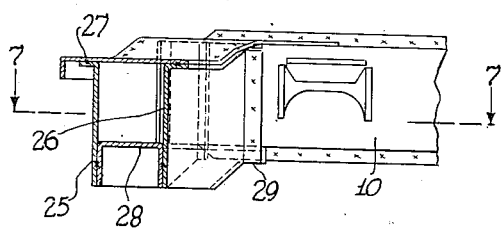
Figure 6 shows the front end of the frame and especially of the front cross member of Figure 1 at an enlarged scale.
Figure 8:
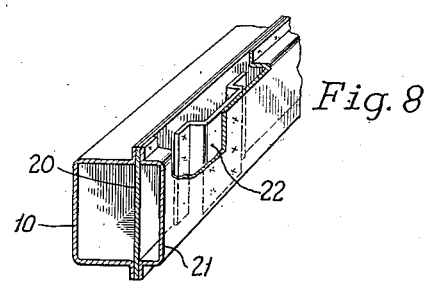
Figure 8 shows in a perspective view partly in section, the construction of the side sill in the region of the front post attachment.
Figure 7:
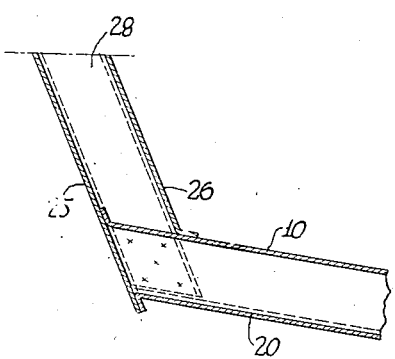
Figure 7 shows the horizontal section through one of the forward corners of the frame substantially along line 7—7 of Figure 6.
Figure 10:
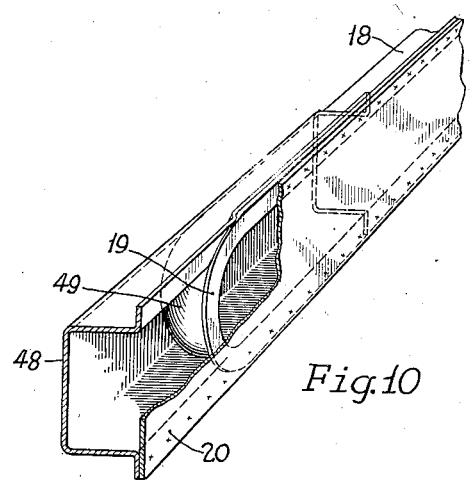
Figure 10 shows a perspective view, partly in section, the side sill construction in the region where a front part and a rear part of the side sill are connected with each other.
Figure 9:
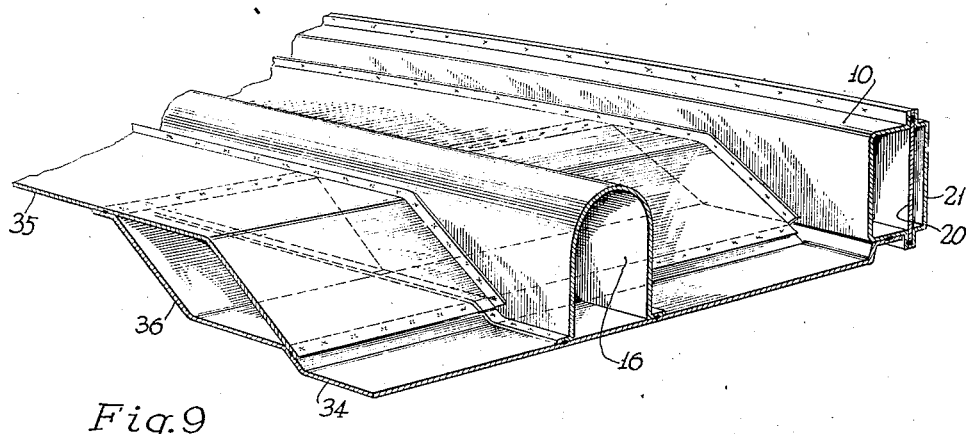
Figure 9 shows a perspective view partly in section of a central part of the frame shown in Figures 1 and 2 but at an enlarged scale.

Hereafter the chassis frame or underframe will, for convenience, be referred to only as the underframe. It consists of two box section longitudinal members or sills designated by 10 as a whole, the forward ends of which are connected with each other by a box section cross member 11 presenting an obtuse angle forwardly. Tubular transverse cross members 12, 13 and 14 interconnect the longitudinal members at spaced intervals, whilst a box-like transverse member 15 constitutes the rear seat frame. The floor panels and the Cardan shaft tunnel 16 are interconnected and reinforced against torsion.

The majority of the parts of the underframe are comprised of comparatively light sheet metal pressings. For the purpose particularly of avoiding the use of large stamping dies and the necessity of employing large sheets the longitudinal members 10 are built up of a plurality of sections. Preferably two such sections suffice, a front and a rear section 48 and 18 respectively, generally of outwardly presenting channel form, the inner wall and the horizontal walls of which overlap and are secured to each other at 17. The rear section 18 of the longitudinal member 10 is telescoped within the front section 48 and terminates at its forward end with a transverse wall 49, extending outwardly and provided with an edge flange 19, arranged to be secured to the outside wall 29 closing the open side of the box section longitudinal member 48, which wall 29 may itself be comprised of a plurality of sections.

In the region of the door openings the outside wall 20 is covered by a shallow inwardly facing channel section member 21 welded through edge flanges to flanges formed on said wall 20. Brackets 22 and 23 are inserted between the member 21 and the outer sill wall 20. These brackets are in the form of vertically arranged inwardly opening channels and are welded by their marginal flanges to the wall 20 and by the bottom wall of the channel to the bottom wall of the channel section member 21. These brackets serve to reinforce the sills at the point where the front post and the intermediate door posts of a body superstructure are to be fastened. The member 21 is closed at its rear end by a member 24 adapted to support a rear door post. The posts, assumed to be in any conventional shape and construction, are not shown in the drawings.

A member 30 is attached to the longitudinal sill 10 between its ends, preferably beneath the front door opening. This member 30 is an outwardly projecting hollow sheet metal member adapted to support the running board or to cooperate with a jack as ordinarily used for lifting the car, for instance, when a tire has to be changed. As will appear from Fig. 5, the member is attached by welding to the lower flange and to the lower section of the main web of the longitudinal member 10 and for this purpose is provided with horizontally extending flanges shown in dotted lines in Fig. 1. Above these flanges, transverse reinforcing partitions 31 which may be of cup-shaped formation are arranged within the longitudinal sills and connected with the upper and lower flanges and with the main web thereof by welding.

The front cross member 11 consists preferably of two vertical bridge pieces 25 and 26 formed with forwardly and rearwardly extending horizontal marginal flanges at their upper edges and connected by an upper cover plate 27, whilst in their lower portions they are connected by a downwardly presenting channel member 28, the assembly being such that when welded together they constitute a particularly stiff box-section structure, which serves to minimize or totally absorb shocks of collision. If desired the box cross section of the transverse member 11 may be further strengthened by additional transverse members.

The connection between the front cross member 11 and the longitudinal members 10 is effected in the following manner. The front end of the member 10 is inserted between and secured to the bottom of the channel section cross member 28 and the upper cover plate 27, which is preferably broadened, and extends up to the bridge piece 26 formed with a rearwardly extending vertical edge flange 29 arranged to lie against the inner side wall of the longitudinal member 10 and to be welded thereto.

As is apparent from Fig. 3 the transverse tube 12 depends downwardly in its mid portion so that the rearmost end of the driving unit can be accommodated, the structure being reinforced by means of intermediate stampings of the tube 12, the Cardan shaft tunnel 16 and the floor panel 35. Each end of the tube 12 projects through an opening provided in the vertical web of the longitudinal sill 10 and projects into an opening of a vertical insert 32 provided within the sill. The insert 32 is of cup-shape, as will appear from Fig. 1. The insert is provided with flanges welded to the web and the flanges of the sill. The cup-shaped insert and the web of the sill cooperate to form a compartment constituting a very efficient reinforcement of the sill at the point of attachment of the transverse tube 12.

The cross tube 13 is similarly welded in an opening of the inside wall of the longitudinal member and in an opening of an insert piece 33 extending between the upper and lower walls of the longitudinal member. In the centre of the tube 13 are welded bearing blocks for the axle gear housing (not shown). The rearmost cross tube 14 is also welded into an opening in the outside wall of the longitudinal member, and supports in its open end a bifurcated member or jaw which serves as anchorage for a strut guiding the swinging rear axles.

The floor panel 34 composed of a plurality of sections is welded at both of its sides to the longitudinal sills. It extends through beneath the open bottom of the tunnel 16 closing the same and is welded to marginal flanges of said tunnel. In this manner I obtain a very efficient transverse reinforcement while, on the other hand, the tunnel prevents the floor panels from bending downwardly in the middle of the chassis. In the region of the front seats a floor panel 35 is provided, as shown in Fig. 2, which extends at a slightly higher level than the floor panel 34 between the longitudinal sills and the tunnel 16. The rearward end of the panel 35 is bent downwardly in inclined position and its rim is welded to the lower panel 34. Moreover a sheet metal member 36 extends parallel to the bent portion of the panel 35 and connects the panels 34 and 35 so as to form therewith a hollow transverse carrier reinforcing structure.

At its forward end the tunnel 16 is extended to present the funnel shaped member 37 which encloses the driving gear housing. The upper parts of the body consisting of side walls and posts may be fastened in any suitable manner to the longitudinal members of the underframe described.

In this manner I have obtained a self-sustaining body the lower part of which serves the dual function of a chassis frame and of the floor structure of the body.

While I have described my invention by reference to its specified embodiment thereof, I wish it to be clearly understood that the scope thereof is not limited to the details specified hereinabove but that the invention is capable of numerous modifications which will readily occur to anyone skilled in the art within the ambit of the claims following hereinafter.

What I claim is:

1. A vehicle chassis frame comprising box section longitudinal side members and a hollow section transverse member interconnecting the front ends of said side members and consisting of two substantially vertical flanged bridge pieces, an upper plate connected with the upper flanges of said bridge pieces and a downwardly presenting channel inserted between the lower margins of said bridge pieces.

2. A vehicle chassis frame comprising the combination of a transverse member consisting of two spaced, substantially vertical flanged bridge pieces, of an upper cover plate connected with the upper flanges of said bridge pieces and widened at its ends and of a downwardly presenting channel member inserted between the lower margins of said bridge pieces, with box section longitudinal side members terminating between and secured to the bottom of said channel member and to said cover plate, said longitudinal member extending substantially to the front bridge piece, the rear bridge piece being formed with a flange lying against and secured to the inner side wall of said longitudinal member.

3. A vehicle chassis frame including longitudinal side sills, each comprising an outwardly presenting channel member provided with vertical flanges, a cover panel secured to said flanges, an inwardly presenting channel member coextensive with an intermediate section of said sill and welded to said outwardly presenting channel member and reinforcing channel members constituting post supports carried between said inwardly presenting channel member and said cover panel.

4. A vehicle chassis frame comprising side sills of box-shaped cross section composed of telescoped sections, a central tunnel adapted to accommodate a Cardan shaft, sheet metal floor panels extending between and connected to said side sills and said tunnel constituting a rigid connection therebetween, one of said floor panels extending over a part only of the longitudinal extent of the frame, and another of said floor panels extending substantially over an adjacent part of said longitudinal extent, these two adjacent said floor panels being arranged at different levels and having their meeting marginal portions in overlapping relationship for a small part of the longitudinal extent of the frame, said marginal portions being shaped and connected with one another to constitute a hollow transverse beam connecting said side sills with said tunnel.

5. In a vehicle frame, longitudinal side sills, sheet metal floor panels extending between and being connected to said side sills, one of said floor panels extending over a part only, and another floor panel over an adjacent part of the longitudinal extent of said frame, said two adjacent floor panels being arranged at different levels and having their adjacent marginal portions in overlapping relationship, the overlapping portions of said two floor panels being shaped and connected with one another to constitute a hollow transverse reinforcing beam in the region between said side sills.

6. A vehicle chassis frame comprising box section longitudinal side members and a hollow section transverse member being generally angle shape in plane view, interconnecting the front ends of said side members and consisting of two separate substantially vertical bridge pieces and a cover plate, said bridge pieces being spaced from each other in the longitudinal direction of the frame and being provided with a forwardly or rearwardly projecting upper flange respectively, said cover plate being connected with said flanges and provided with a substantially vertical flange along at least one of its edges, said bridge pieces being connected to the vertical walls of said longitudinal side members and the end portions of said cover plate overlapping and being connected to the upper walls of said longitudinal side members.

7. In a vehicle frame, two longitudinal side sills interconnected by a plurality of transverse braces, each side sill comprising a first hollow section member and a second channel member, said second member having one of its end portions telescope into one of the end portions of said first member, said end of the second member being closed by a transverse wall portion which is additionally connected to one wall of said first member.

8. In a vehicle frame construction, a box-sectional sill portion comprising two walls which are about parallel to and spaced from each other, a channel member being arranged within said sill portion, said member extending transversely to the longitudinal direction of said sill portion and having its mouth facing the one of said sill walls, the margins of the side walls of said channel member being fastened to the one of said sill walls while the bottom wall of said channel member engages to some extent the other of said sill walls, said channel member thereby bridging the space between said two sill walls and constituting a support for a member to be connected with said sill portion at the outer surface of one of said sill walls in the region of said channel member.

9. In a vehicle frame construction, a box-sectional sill portion being composed of a substantially web-shaped member and a channel member, the opening of said channel member facing one surface of said web-shaped member, a second channel member being arranged within said first channel member and extending transversely to the latter, the mouth of the second channel member facing the same surface of said web-shaped member as said first channel member, the margins of the side walls of said second channel member being fastened to said web-shaped member, the bottom wall of said two channel members resting against each other, said second channel member constituting a support for a member to be connected with said sill portion at the outer surface of said first-named channel member, and an effective transverse brace between bottom wall of the first channel member and the web-shaped member.

10. In a vehicle frame, a box sectional side sill comprising a first channel member and a second channel member, said second channel member having one of its end portions telescope into one of the end portions of said first channel member, the openings of both channel members facing in the same direction and being closed by a web shaped member, the end of the said second channel member being closed by a transverse wall which is additionally connected to said web shaped member.

11. In a vehicle frame according to claim 10, said two channel members being provided along their free longitudinal edges with outwardly bent off flanges serving for the attachment of said web shaped member, said flanges of the second channel member being continued by a flange along the edge of said transverse wall which flange serves also for the connection to said web shaped member.

FRANZ BRUSS.